United States Patent
Matsuyama et al.

(10) Patent No.: US 10,132,499 B2
(45) Date of Patent: Nov. 20, 2018

(54) FUEL INJECTION DEVICE

(71) Applicants: KAWASAKI JUKOGYO KABUSHIKI KAISHA, Kobe-shi, Hyogo (JP); JAPAN AEROSPACE EXPLORATION AGENCY, Chofu-shi, Tokyo (JP)

(72) Inventors: Ryusuke Matsuyama, Akashi (JP); Masayoshi Kobayashi, Kobe (JP); Atsushi Horikawa, Akashi (JP); Hitoshi Fujiwara, Chofu (JP)

(73) Assignees: KAWASAKI JUKOGYO KABUSHIKI KAISHA, Kobe-shi, Hyogo (JP); JAPAN AEROSPACE EXPLORATION AGENCY, Chofu-shi, Tokyo (JP)

( * ) Notice: Subject to any disclaimer, the term of this patent is extended or adjusted under 35 U.S.C. 154(b) by 590 days.

(21) Appl. No.: 14/557,877

(22) Filed: Dec. 2, 2014

(65) Prior Publication Data
US 2015/0082797 A1    Mar. 26, 2015

Related U.S. Application Data

(63) Continuation of application No. PCT/JP2013/065432, filed on Jun. 4, 2013.

(30) Foreign Application Priority Data

Jun. 7, 2012 (JP) .................................. 2012-129681

(51) Int. Cl.
*F23R 3/14*    (2006.01)
*F23R 3/16*    (2006.01)
(Continued)

(52) U.S. Cl.
CPC .................. *F23R 3/16* (2013.01); *F23R 3/14* (2013.01); *F23R 3/18* (2013.01); *F23R 3/28* (2013.01);
(Continued)

(58) Field of Classification Search
CPC ...... F23R 3/14; F23R 3/16; F23R 3/18; F23R 3/34; F23R 3/343
(Continued)

(56) References Cited

U.S. PATENT DOCUMENTS 3,853,273 A * 12/1974 Bahr ......................... F23R 3/14
                                                                239/402
5,239,831 A *  8/1993 Kuroda ................... F23R 3/343
                                                                 60/733

(Continued)

FOREIGN PATENT DOCUMENTS

JP    50-77716 A     6/1975
JP    11-101435 A    4/1999
(Continued)

OTHER PUBLICATIONS

International Preliminary Report on Patentability from the International Searching Authority dated Dec. 18, 2014 in counterpart application No. PCT/JP2013/065432.
(Continued)

*Primary Examiner* — Todd E Manahan
*Assistant Examiner* — Eric Linderman
(74) *Attorney, Agent, or Firm* — Sughrue Mion, PLLC

(57) ABSTRACT

A fuel injection device for supplying a fuel to a compressed air includes: a pilot fuel injector; a main fuel injector located at an outer periphery of the pilot fuel injector; and an air injection unit located between an outlet end portion of the pilot fuel injector and the main fuel injector. The air injection unit includes: a partition wall plate separating the air injec-
(Continued)

tion unit from a combustion chamber; a flame stabilization plate provided at a downstream side of the partition wall plate; a first opening at a downstream side between the flame stabilization plate and the outlet end portion of the pilot fuel injector; and a second opening provided in the partition wall plate and through which the compressed air is supplied. The flame stabilization plate includes an inclined portion inclined in a radially outward and downstream direction with respect to an axis.

6 Claims, 4 Drawing Sheets

(51) Int. Cl.
    *F23R 3/18*     (2006.01)
    *F23R 3/34*     (2006.01)
    *F23R 3/28*     (2006.01)
(52) U.S. Cl.
    CPC ............... *F23R 3/34* (2013.01); *F23R 3/343* (2013.01); *Y02T 50/675* (2013.01)
(58) Field of Classification Search
    USPC .................................................. 60/737, 740
    See application file for complete search history.

(56) References Cited

U.S. PATENT DOCUMENTS

| | | | | |
|---|---|---|---|---|
| 5,647,538 A * | 7/1997 | Richardson | F23D 11/101 | 239/405 |
| 5,816,049 A * | 10/1998 | Joshi | F23C 7/004 | 60/39.463 |
| 5,894,732 A * | 4/1999 | Kwan | F23R 3/283 | 60/748 |
| 6,035,645 A * | 3/2000 | Bensaadi | F23R 3/14 | 60/742 |
| 6,381,964 B1 * | 5/2002 | Pritchard, Jr. | F23R 3/14 | 60/746 |
| 6,389,815 B1 * | 5/2002 | Hura | F23R 3/346 | 60/746 |
| 6,418,726 B1 * | 7/2002 | Foust | F23R 3/14 | 60/748 |
| 6,442,940 B1 * | 9/2002 | Young | F23R 3/14 | 29/890.01 |
| 6,453,660 B1 * | 9/2002 | Johnson | F23C 99/00 | 60/39.821 |
| 6,530,227 B1 * | 3/2003 | Young | F23D 14/78 | 60/748 |
| 6,546,732 B1 * | 4/2003 | Young | F23D 14/78 | 60/740 |
| 6,557,350 B2 * | 5/2003 | Farmer | F23R 3/283 | 60/39.821 |
| 6,581,386 B2 | 6/2003 | Young et al. | | |
| 6,959,535 B2 * | 11/2005 | Mancini | F23R 3/343 | 60/39.094 |
| 7,716,931 B2 * | 5/2010 | Mancini | F23R 3/14 | 60/737 |
| 7,762,073 B2 * | 7/2010 | Li | F23R 3/14 | 60/734 |
| 7,827,800 B2 * | 11/2010 | Stastny | F23R 3/002 | 60/39.11 |
| 8,001,786 B2 | 8/2011 | Oda et al. | | |
| 8,316,541 B2 * | 11/2012 | Patel | F23R 3/002 | 29/889.22 |
| 8,910,483 B2 * | 12/2014 | Von Der Bank | F23R 3/32 | 60/737 |
| 9,109,553 B2 * | 8/2015 | Matsuyama | | |
| 2002/0162333 A1 * | 11/2002 | Zelina | F23R 3/14 | 60/776 |
| 2002/0178732 A1 * | 12/2002 | Foust | F23R 3/14 | 60/776 |
| 2003/0061815 A1 * | 4/2003 | Young | B23P 6/00 | 60/748 |
| 2005/0039456 A1 * | 2/2005 | Hayashi | F23D 11/107 | 60/737 |
| 2005/0081528 A1 * | 4/2005 | Howell | F23R 3/14 | 60/748 |
| 2006/0021350 A1 * | 2/2006 | Sanders | F23D 11/101 | 60/743 |
| 2006/0123792 A1 * | 6/2006 | Xu | F23R 3/14 | 60/737 |
| 2007/0028617 A1 * | 2/2007 | Hsieh | F23R 3/14 | 60/737 |
| 2007/0101725 A1 * | 5/2007 | Marakovits | F23R 3/343 | 60/775 |
| 2007/0137207 A1 * | 6/2007 | Mancini | F23R 3/14 | 60/737 |
| 2007/0193273 A1 * | 8/2007 | DeVane | F23R 3/002 | 60/752 |
| 2007/0269757 A1 * | 11/2007 | Commaret | F23R 3/10 | 431/265 |
| 2007/0289305 A1 * | 12/2007 | Oda | F23D 11/383 | 60/748 |
| 2008/0168773 A1 * | 7/2008 | Sandelis | F23R 3/14 | 60/748 |
| 2008/0202122 A1 * | 8/2008 | Guezengar | F23R 3/14 | 60/722 |
| 2008/0236165 A1 * | 10/2008 | Baudoin | F23R 3/343 | 60/746 |
| 2008/0289340 A1 * | 11/2008 | Oda | F23R 3/28 | 60/737 |
| 2008/0302105 A1 * | 12/2008 | Oda | F23R 3/28 | 60/737 |
| 2009/0049840 A1 * | 2/2009 | Cayre | F23R 3/14 | 60/748 |
| 2009/0255120 A1 * | 10/2009 | McMasters | F23D 11/383 | 29/889.2 |
| 2010/0012750 A1 * | 1/2010 | Duncan | F23R 3/14 | 239/265.19 |
| 2010/0251719 A1 * | 10/2010 | Mancini | F23R 3/14 | 60/737 |
| 2010/0263382 A1 * | 10/2010 | Mancini | F23R 3/14 | 60/742 |
| 2010/0269506 A1 * | 10/2010 | Nonaka | F23D 11/386 | 60/742 |
| 2011/0271682 A1 * | 11/2011 | Sandelis | F23C 7/004 | 60/737 |
| 2012/0151929 A1 * | 6/2012 | Patel | F23R 3/28 | 60/740 |
| 2012/0204567 A1 * | 8/2012 | Hernandez | F23R 3/14 | 60/737 |
| 2012/0305673 A1 * | 12/2012 | Matsuyama | F23R 3/343 | 239/533.2 |
| 2013/0025288 A1 * | 1/2013 | Cunha | F23R 3/002 | 60/772 |
| 2013/0036739 A1 * | 2/2013 | Horikawa | F23R 3/28 | 60/735 |
| 2013/0118177 A1 * | 5/2013 | Bunel | F23R 3/002 | 60/740 |
| 2013/0291546 A1 * | 11/2013 | Cortes | F23D 11/24 | 60/735 |
| 2013/0327849 A1 * | 12/2013 | Matsuyama | F02M 23/12 | 239/406 |
| 2014/0026580 A1 * | 1/2014 | Pardington | F23R 3/14 | 60/748 |
| 2014/0090381 A1 * | 4/2014 | Rullaud | F23R 3/14 | 60/740 |
| 2014/0250907 A1 * | 9/2014 | Twardochleb | F02C 7/22 | 60/776 |
| 2015/0292743 A1 * | 10/2015 | Mook | F23R 3/14 | 60/806 |
| 2015/0316266 A1 * | 11/2015 | Prade | F23N 5/16 | 60/776 |
| 2016/0209037 A1 * | 7/2016 | Dai | F23R 3/14 | |
| 2016/0215983 A1 * | 7/2016 | Rullaud | F23R 3/10 | |
| 2016/0265778 A1 * | 9/2016 | Patel | F23R 3/286 | |

(56) References Cited

U.S. PATENT DOCUMENTS

| | | | |
|---|---|---|---|
| 2016/0265780 A1* | 9/2016 | Patel | F23R 3/283 |
| 2017/0003030 A1* | 1/2017 | Benjamin | F23R 3/283 |
| 2017/0009995 A1* | 1/2017 | Witham | F02C 3/00 |

FOREIGN PATENT DOCUMENTS

| | | |
|---|---|---|
| JP | 2002-139221 A | 5/2002 |
| JP | 2005-114193 A | 4/2005 |
| JP | 2008-196831 A | 8/2008 |
| JP | 2011080669 A | 4/2011 |
| JP | 4800523 A | 10/2011 |
| JP | 2012-251742 A | 12/2012 |
| WO | 2011/092779 A1 | 8/2011 |

OTHER PUBLICATIONS

Communication dated Jan. 25, 2016, from the European Patent Office in counterpart European Application No. 13801226.5.

Communication dated Jun. 16, 2015, issued by the State Intellectual Property Office in corresponding Chinese Application No. 201380027505.0.

International Search Report for PCT/JP2013/065432 dated Sep. 10, 2013.

Communication dated Mar. 22, 2016, from the Japanese Patent Office in counterpart application No. 2012-129681.

\* cited by examiner

FUEL INJECTION DEVICE

CROSS REFERENCE TO THE RELATED APPLICATION

This application is a continuation application, under 35 U.S.C. § 111(a), of international application No. PCT/JP2013/065432, filed Jun. 4, 2013, which claims priority to Japanese patent application No. 2012-129681, filed Jun. 7, 2012, the disclosure of which are incorporated by reference in their entirety into this application.

BACKGROUND OF THE INVENTION

Field of the Invention

The present invention relates to a fuel injection device for use in, for example, a gas turbine engine and, more particularly, to the fuel injection device equipped with a complex fuel injection device comprised of a plurality of fuel nozzles.

Description of Related Art

In recent years, in consideration of the environment, there is a need for a reduction of emissions such as NOx (nitrogen oxide) emitted from gas turbine engines. A fuel injection device of the conventional aircraft gas turbine combustor is of a diffusive combustion type, and since in the diffusion combustion, the burning reaction takes place based on the stoichiometric mixture ratio, the flame temperature tends to increase. Considering that the emission of NOx is known to exponentially increase with the increase of the flame temperature, lowering of the flame temperature appears to effectively suppress the emission of NOx. However, in the current situation of the propensity for high temperature and high pressure in the gas turbine, further suppression of the emission of NOx with the conventional diffusive combustion method is limited.

In order to lower the flame temperature, a fuel injection device of a lean premixed combustion method is considered effective. The lean premixed combustion method is known to be a method of burning an air-fuel mixture in which the ratio of fuel relative to air is lowered, and the lean combustion according to this method contributes to a considerable reduction of the flame temperature as compared with that afforded by the conventional diffusive combustion method. On the other hand, however, the lean premixed combustion method tends to result in an instable and incomplete combustion of the air-fuel mixture because of the relatively low flame temperature. In view of this, a concentric fuel injection device has been used to realize a low NOx emission, in which while a pilot fuel injector is located on an inner side and a main injector is located coaxially with, and outer side of the pilot fuel injector. In the concentric fuel injection device, the diffusive combustion method with the pilot fuel injector is used to maintain a stable combustion at a low power operation, while the lean premixed combustion method with the main fuel injector is used in addition to the diffusive combustion with the pilot fuel injector at a high power operation.

In the concentric fuel injection device, even at low power settings at which only the pilot injector operates, a large amount of air flows through a flow path in the main injector. Accordingly, there is a possibility that the air and pilot combustion interfere with each other and the combustion efficiency, the ignition, and the flame stability of the pilot injector is lowered. In order to overcome the problem, for example, there have been the following proposals: a pilot combustion region and a main combustion region are greatly separated from each other and it is configured that the pilot combustion region and the main combustion region appropriately interfere with each other at intermediate power settings while suppressing interference between air in a main path and pilot combustion at low power settings, thereby achieving stable combustion in the main combustion region (see, e.g., Patent Document 1); and a fuel is intensively injected to a reverse-flow region on an axis of a combustion chamber, thereby improving the combustion efficiency at low power settings (e.g., JP Patent Application No. 2011-125481).

PRIOR ART DOCUMENT

Patent Document

[Patent Document 1] JP Patent No. 4800523

SUMMARY OF THE INVENTION

However, in the device of Patent Document 1, an interference region remains between the pilot combustion region and the main combustion region, and thus the combustion efficiency at low power settings is insufficient. Furthermore, when the fuel is intensively injected to the reverse-flow region on the axis as disclosed in JP Patent Application No. 2011-125481, the fuel is excessive in this region and smoke easily occurs.

In order to solve the above-described problems, an object of the present invention is to provide a fuel injection device which achieves high combustion efficiency both at low power settings and at intermediate power settings while suppressing occurrence of smoke caused due to excess of a fuel.

In order to achieve the above-described object, a fuel injection device according to the present invention is a fuel injection device for supplying a fuel to a compressed air from a compressor for combustion, which includes: a pilot fuel injector located at a radially center portion of the fuel injection device and configured to inject the fuel into a combustion chamber; a main fuel injector located at an outer periphery of the pilot combustion injector and configured to inject a premixed air-fuel mixture of the fuel and air into the combustion chamber; and an air injection unit located between an outlet end portion of the pilot fuel injector and the main fuel injector and configured to inject the compressed air into the combustion chamber, in which the air injection unit includes: a partition wall plate separating the air injection unit from the combustion chamber; a flame stabilization plate provided at a downstream side of the partition wall plate; a first opening provided between the flame stabilization plate and the outlet end portion of the pilot fuel injector and opened at a downstream side; and a second opening which is provided in the partition wall plate and through which the compressed air is supplied to an inflow space defined between the flame stabilization plate and the partition wall plate, and in which the flame stabilization plate includes an inclined portion inclined in a radially outwardly and in a downstream direction with respect to an axis. The second opening may be provided, for example, as a throughhole extending axially and formed in a portion of the partition wall plate that is covered by the flame stabilization plate. The inclined portion may extend substantially parallel to the partition wall plate.

With this configuration, by the flame stabilization plate including the inclined portion, interference between a pilot combustion region and main air flow is effectively prevented, thus the flame stability is enhanced, and the combustion efficiency is improved. In addition, the air supplied from the second opening flows into the inflow space between the flame stabilization plate and the partition wall plate to cool the flame stabilization plate. Thus, burnout of the flame stabilization plate is prevented. Furthermore, by the air being supplied from the first opening into the combustion chamber, it is possible to avoid a state where the fuel is excessive in the pilot combustion region, and thus it is possible to suppress occurrence of smoke.

In one embodiment of the present invention, the flame stabilization plate may include a peripheral wall portion which is continued to an upstream side of the inclined portion and extends in an axial direction, so as to form an outer periphery of the first opening. With this configuration, the air supplied from the second opening does not flow into the inner diameter side and is assuredly discharged in the radially outward oblique and downstream direction, and thus it is possible to further assuredly improve the combustion efficiency and suppress smoke.

In one embodiment of the present invention, the pilot fuel injector and the main fuel injector may be connected to each other via a partition wall forming a reservoir space for the compressed air at a downstream side of the air injection unit, and the partition wall may be formed with an introduction port for introducing the compressed air into the reservoir space. With this configuration, the reservoir space for the compressed air is formed by the partition wall, and the compressed air is injected from the first opening and the second opening through the reservoir space. Thus, the distribution of the air injected from the first opening and the second opening is made uniform.

In one embodiment of the present invention, the pilot fuel injector may be provided with a swirler configured to swirl the compressed air about an axis thereof. With this configuration, the fuel injected from the pilot fuel injector is diffused to the radially outer side by the swirler. Thus, the flame stability at the flame stabilization plate is ensured, and the combustion efficiency is further assuredly improved.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
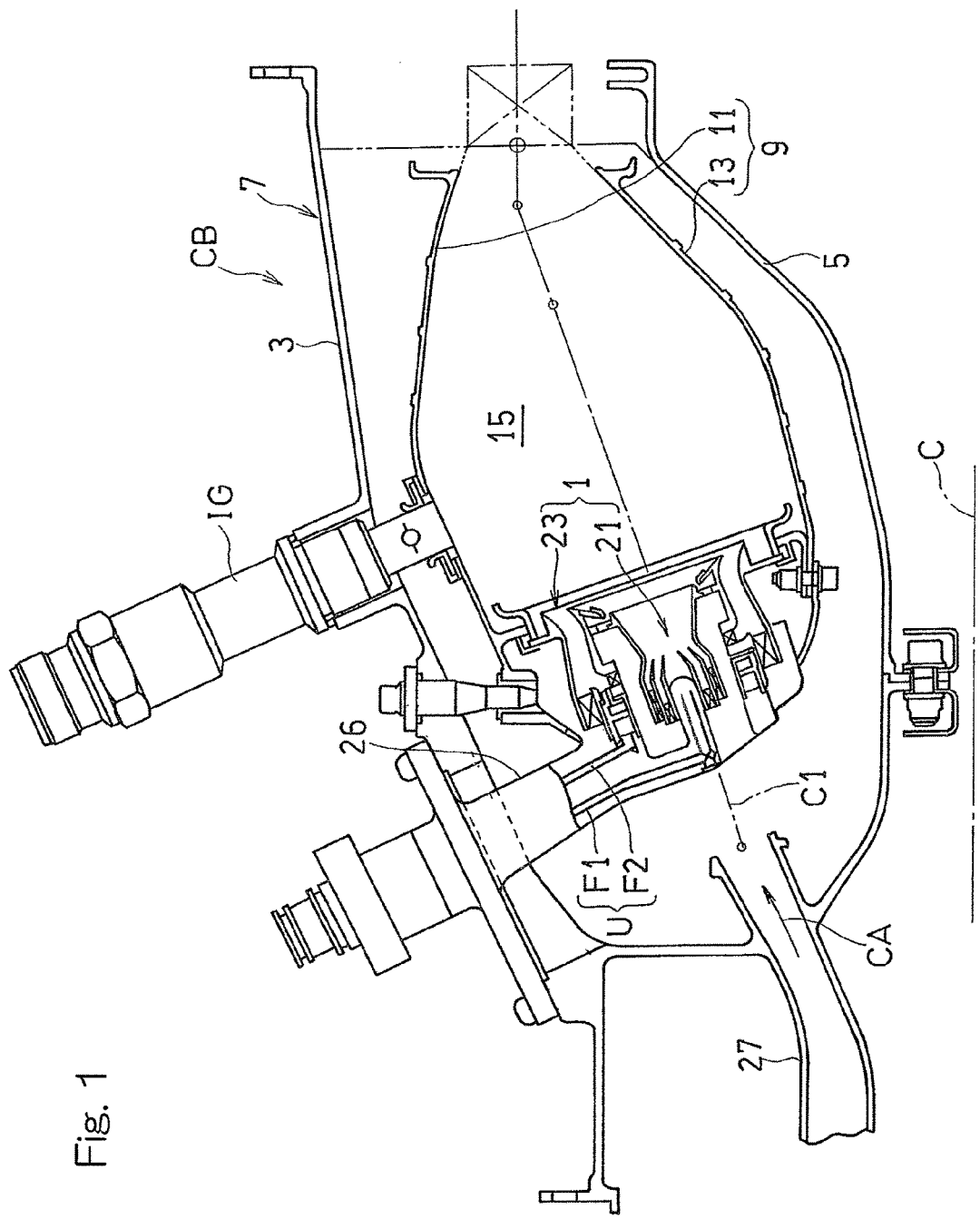
FIG. 1 is a sectional view showing a combustor for a gas turbine engine equipped with a fuel injection device designed in accordance with an embodiment.

Hereinafter, embodiments of the present invention will be described in detail with reference to the accompanying drawings. FIG. 1 illustrates a combustor CB for a gas turbine engine equipped with a fuel injection device 1 designed in accordance with an embodiment of the present invention. The combustor CB is operable to mix fuel with a compressed air CA, fed from a compressor (not shown) of the gas turbine engine, and burn the resultant air-fuel mixture to produce high temperature and high pressure combustion gases, which are in turn fed to a turbine to drive this turbine.

The combustor CB is of an annular configuration and includes an annular outer casing 3 and an inner casing 5 located radially inner side of the outer casing 3, which casings 3 and 4 are positioned in a coaxial relation with an engine rotary longitudinal axis C so as to form a combustor housing 7 having an annular inner space defined therein. The annular inner space of the combustor housing 7 accommodates therein an annular combustion liner 9 in a coaxial relation with the combustor housing 7. The combustion liner 9 is made up of an annular outer liner 11 and an annular inner liner 13 coaxially located inwardly of the annular outer liner 11 and has an annular combustion chamber 15 defined therein. The combustion liner 9 has a top wall provided with a plurality of fuel injection devices 1 for injecting fuel into the combustion chamber 15, which devices 1 are arranged coaxially with the engine rotary longitudinal axis C and spaced equidistantly from each other in a direction circumferentially of the combustion liner 9.

Each of the fuel injection devices 1 includes a pilot fuel injector 21 and a main fuel injector 23. The main fuel injector 23 is so positioned in a round row as to surround an outer periphery of the pilot fuel injector 21 in a coaxial relation with a longitudinal axis C1 of the pilot fuel injector 21 and generate a premixed air-fuel mixture. Each of the fuel injection devices 1 is supported by the combustor housing 7 by means of a stem portion 26 secured to the combustor housing 7. An ignition plug IG for ignition extends through the outer casing 3 and the outer liner 11 and is located so as to face in a direction radially of the combustion liner 9 with its igniting end positioned in the vicinity of the fuel injection device 1.

The compressed air CA, fed from the compressor, is introduced into the annular inner space of the combustor housing 7 through a plurality of air intake tubes 27 that are positioned spaced equidistantly in a circumferential direction thereof about the engine rotary longitudinal axis C. The compressed air CA so introduced into the annular inner space is supplied to the fuel injection devices 1 and also into the annular combustion chamber 15 through a plurality of air intake ports each defined in the outer and inner liners 11 and 13 of the combustion liner 9. The stem portion 26 referred to previously forms a fuel piping unit U. This fuel piping unit U includes a first fuel supply system F1 for supplying fuel to the pilot fuel injector 21 for the diffusive combustion and a second fuel supply system F2 for supplying fuel to the main fuel injector 23 for the combustion of a lean premixed air-fuel mixture.

Figure 2:
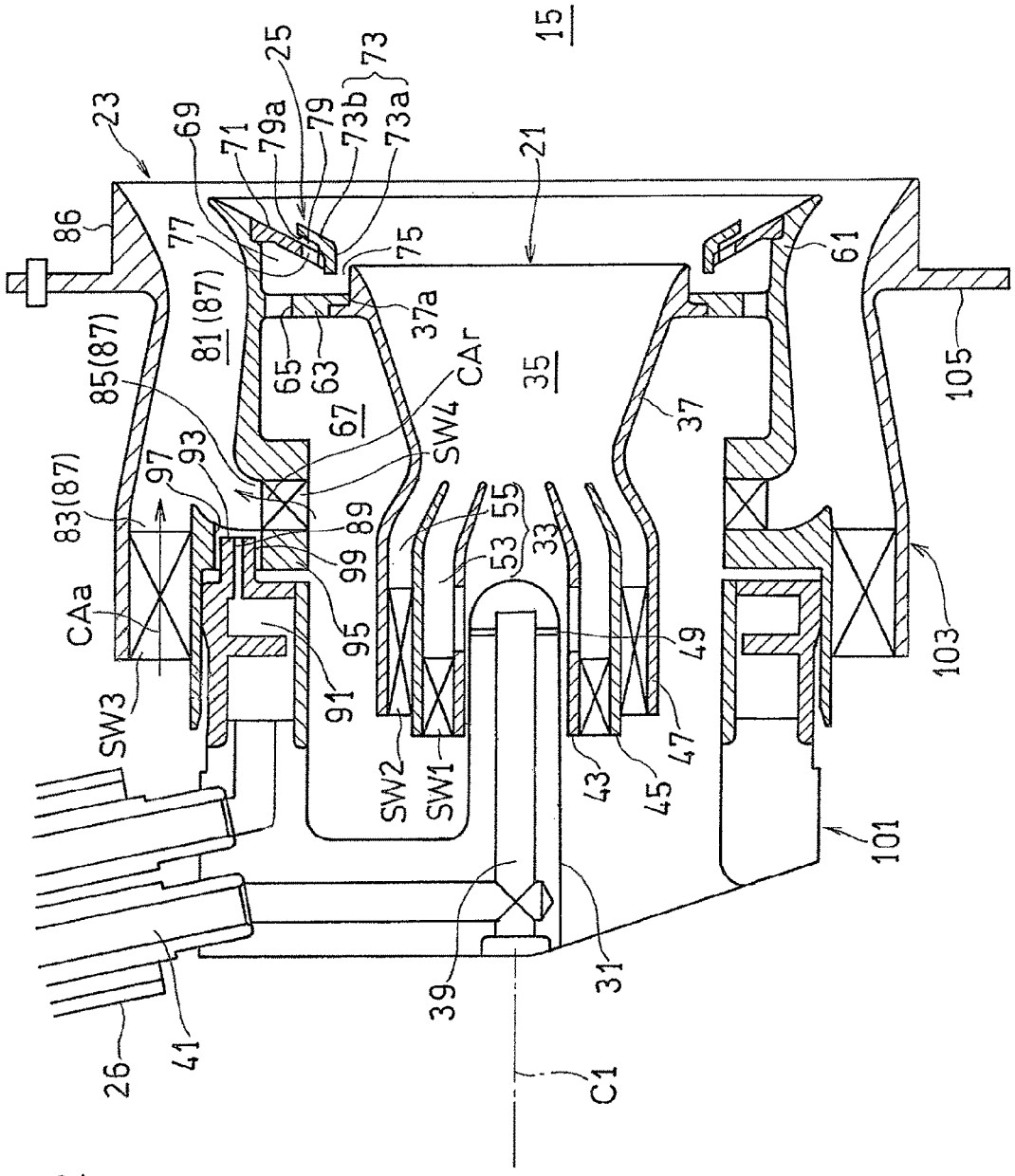
FIG. 2 is a sectional view of the fuel injection device designed in accordance with an embodiment.

The detailed structure of the fuel injection devices 1 is shown in FIG. 2. The fuel injection device 1 includes, as hereinabove described, the pilot fuel injector 21 positioned at a radially center position, and the main fuel injector 23 located radially outwardly of the fuel injection device 1, that is, on an outer periphery side of the pilot fuel injector 21 and also includes an air injection unit provided at a location intermediate between an outlet end of the pilot fuel injector 21 and the main fuel injector 23.

The pilot fuel injector 21 includes a pilot fuel injection block 31 coupled with the stem portion 26 to inject the fuel, an air supply unit 33 provided radially outwardly of the pilot fuel injection block 31 for supplying the compressed air CA, and a tapered pilot nozzle 37 that defines a pilot flow path 35 for premixing fuel fed from the pilot fuel injection block 31, with the compressed air CA fed from the air supply unit 33, and then injecting the resultant premix into the combustion chamber 15. A fuel supply passage 39 that defines a flow path of the fuel is formed at a radially center location within the pilot fuel injection block 31. The fuel supply passage 38 of the pilot fuel injection block 31 referred to above is communicated with a first fuel introducing passage 41 forming a flow path of the fuel.

More specifically, an inner tubular body 43 is located radially outwardly of the pilot fuel injection block 31, an outer tubular body 45 is located radially outwardly of the inner tubular body 43, and a cylindrical pilot shroud 47 having a downstream end portion formed as the pilot nozzle 37 referred to previously is located radially outwardly of the outer tubular body 45. By this pilot shroud 47, the pilot fuel injector 21 and the air injection unit 25 on an outer side are defined separately from each other. Each of the inner tubular body 43 and the end portion (downstream end portion) of the outer tubular body 45 is tapered in a downward direction so as to have a corresponding reduced diameter.

The pilot fuel injection block 31 includes a plurality of radially extending fuel injection ports 49. Also, an inner pilot air passage 53 is formed between the inner tubular body 43 and the outer tubular body 45 and an outer pilot air passage 55 is formed between the outer tubular body 45 and the pilot shroud 47. Those air passages 53 and 55 cooperate with each other to define the air supply unit 33 referred to previously and have respective upstream portions provided with an inner pilot swirler S1 and an outer pilot swirler S2 both operable to swirl the compressed air CA about a longitudinal axis. Accordingly, the fuel injected from the fuel injection port 49 is supplied towards the downstream side together with the compressed air CA supplied from the air passages 53 and 55.

The air injection unit 25 referred to above is formed between the pilot shroud 47 and an inner main shroud 61 located radially outwardly of the pilot shroud 47 so as to define an inner peripheral wall of the main fuel injector 23. The pilot shroud 47 of the pilot fuel injector 21 and the inner main shroud 61 of the main fuel injector 23 are connected together by an annular partition wall 63. The partition wall 63 is formed integrally with the inner main shroud 61 and is located at an axial position in the vicinity of an outlet end portion 37a of the pilot nozzle 37 of the pilot shroud 47. This partition wall 63 has a plurality of introduction ports 65, each in the form of an axially extending throughhole, which are distributed at respective circumferential locations. Accordingly, the compressed air CA having passed through a compressed air passage 67 for the compressed air CA, which passage 67 is defined at a location upstream side of the partition wall 63, by way of the introduction ports 65 is guided towards a reservoir space 69 formed at a location downstream side of the partition wall 63.

The inner main shroud 61, forming a part of the air injection unit 25, has a downstream end portion so shaped as to have a diameter increasing towards the downstream side. This downstream end portion of the inner main shroud 61 is provided with an annular partition wall plate 71 inclined radially inwardly in an upstream direction. The combustion chamber 15 and the air injection unit 25 are separated from each other by the partition wall plate 71. This partition wall plate 71 has an inner diameter side end portion having a flame stabilization plate 73 fitted thereto.

Figure 3:
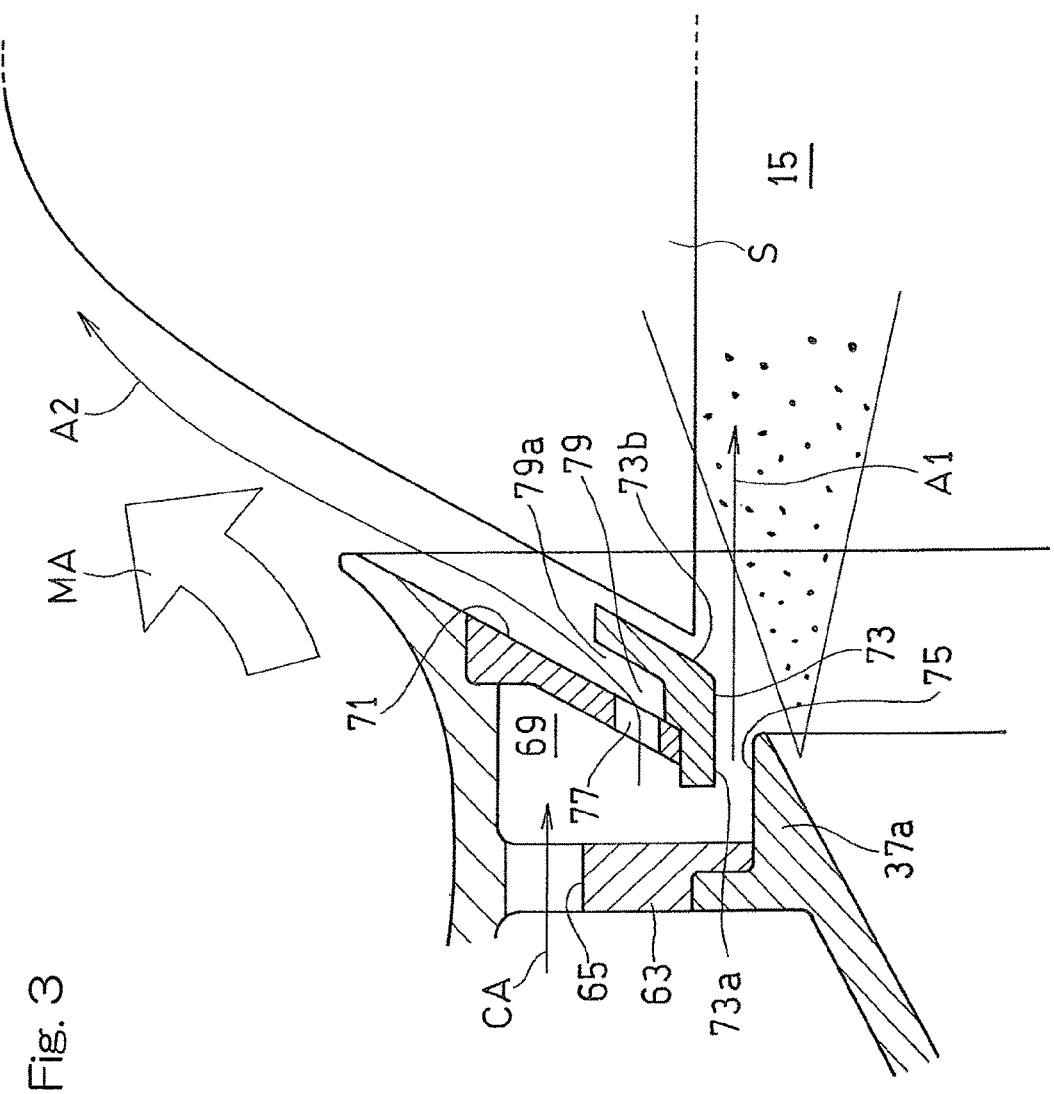
FIG. 3 is a sectional view showing, on an enlarged scale, an air injection unit shown in FIG. 2.

This flame stabilization plate 73 is made up of an axially extending tubular peripheral wall portion 73a and an inclined portion 73b extending from a downstream end of the peripheral wall portion 73a towards the downstream side so as to have an increased diameter. In other words, the inclined portion 73b of the flame stabilization plate 73 is inclined radially outwardly and downstream with respect to the axis. The peripheral wall portion 73a of the flame stabilization plate 73 is secured to the inner diameter side end portion of the partition wall plate 71. Also, as best shown in FIG. 3, the inclined portion 73b of the flame stabilization plate 73 extends at such an angle of inclination as to extend substantially parallel to the partition wall plate 71, and is spaced a distance from the partition wall plate 71 with a gap defined between the inclined portion 73b and the partition wall plate 71. In other words, the inclined portion 73b of the flame stabilization plate 73, while the gap is defined between the inclined portion 73b and the partition wall plate 71 as described above, covers the downstream side of the inner diameter side end portion of the partition wall plate 71.

A radially extending annular gap is defined between the flame stabilization plate 73 and the downstream end portion of the pilot nozzle 37, and this annular gap defines an inner diameter side air injection opening 75, which is a first opening open towards the downstream side. Also, a portion of the partition wall plate 71, which is covered by the flame stabilization plate 73, is formed with an outer diameter side air injection opening 77, which is a second opening that extends axially. A portion of the compressed air CA discharged into the reservoir space 69 is injected axially from the inner diameter side air injection opening 75 into the combustion chamber 15 and the remaining portion of such compressed air CA is, after having passed through the outer diameter side air injection opening 77 into a inflow space 79, which is a gap defined between the partition wall plate 71 and the flame stabilization plate 73, injected radially outwardly from an injection port 79a, which is a downstream end of the inflow space 79, into the combustion chamber 15.

As shown in FIG. 2, the main fuel injector 23 has an annular premixed air-fuel mixture passage 81 for discharging and injecting the premixed air-fuel mixture towards the combustion chamber 15, an outer main air passage 83 for supplying a compressed air CAa from an axially upstream side into the premixed air-fuel mixture passage 81, and an inner main air passage 85 for supplying a compressed air CAr into the premixed air-fuel mixture passage 81 from an radially inner side towards a radially outer side. A cylindrical outer main shroud 86 forming a main nozzle is located coaxially on an outer side of the inner main shroud 61, and the premixed air-fuel mixture passage 81 is formed between the inner main shroud 61 and the outer main shroud 86. The premixed air-fuel mixture passage 81, the outer main air passage 83 and the inner main air passage 85 altogether forms a main flow passage 87 for generating a premixed air-fuel mixture in the main fuel injector 23. The outer main air passage 83 and the inner main air passage 85 are provided with an outer main swirler SW3 and an inner main swirler SW4, respectively, for swirling the associated compressed air CAa and CAr about corresponding longitudinal axes.

The main fuel injector 23 is provided with a plurality of main fuel injection ports 89 for injecting fuel from an axially upstream side into the inner main air passage 85. The plurality of those main fuel injection ports 89 are located radially inwardly of the outer main air passage 83 and equidistantly spaced from each other in a circumferential direction about the longitudinal axis C1. Each of those main fuel injection ports 89 is formed as a throughhole provided at a center portion of a main fuel injection block 93 of, for example, a columnar shape so as to protrude from an annular fuel introducing chamber 91 towards an axially downstream side.

Figure 4:
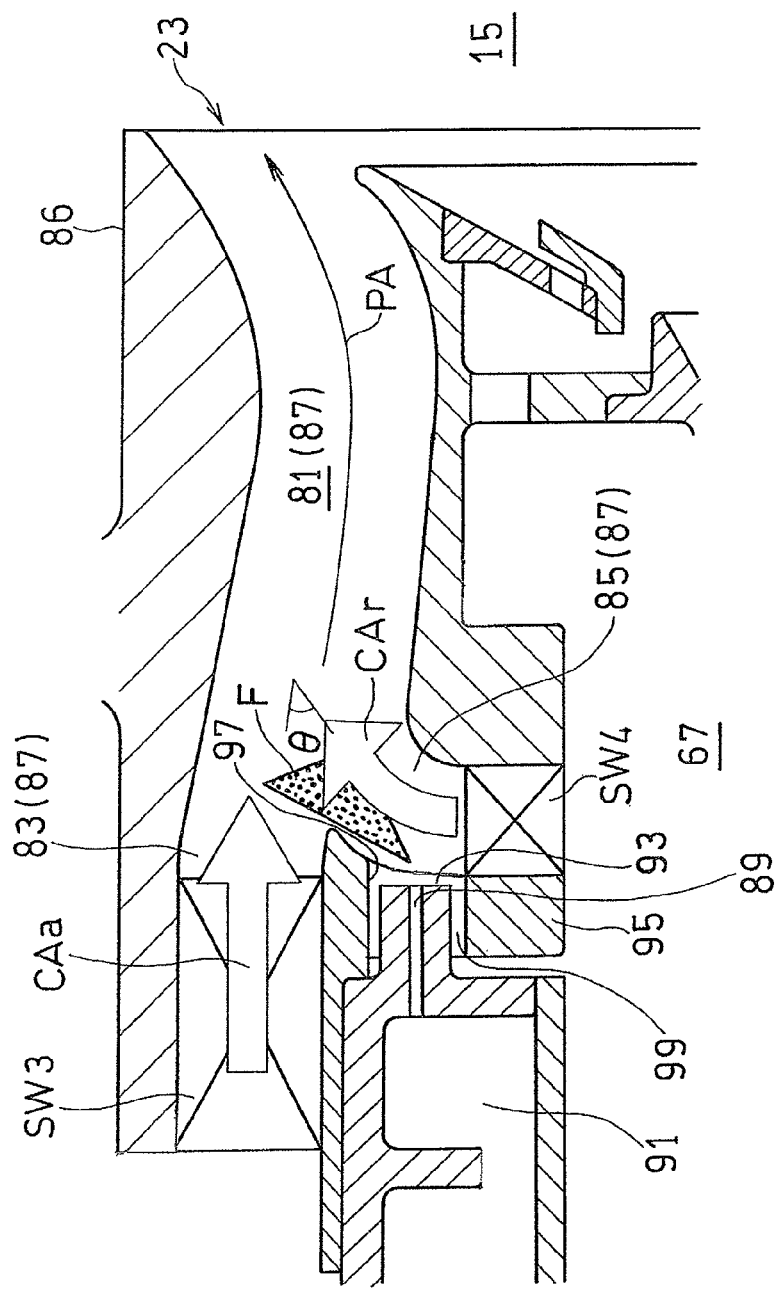
FIG. 4 is a sectional view showing, in an enlarged scale, a main fuel injector shown in FIG. 2.

Also, the main fuel injection block 93 is positioned so as to confront an axially extending throughhole 97, which is defined in a flanged partition wall 95 forming a front wall (upstream side wall) of the inner main air passage 85. As shown in FIG. 4, an annular gap delimited between the main fuel injection block 93 and each of the throughholes 97 in the flanged partition wall 95, both so formed as described above, is communicated with an air passage, external to the fuel injection device 1, and the compressed air passage 67 so as to define a guide air supply passage 99 for injecting the compressed air CA from the upstream side of the longitudinal axis direction into the inner main air passage 85. In other words, the guide air supply passage 99 is operable to inject the compressed air CAr from the upstream side of the longitudinal axis direction into the inner main air passage 85 so as to follow the fuel flow F from a main fuel injection port 89 in the main fuel injection block 93.

As shown in FIG. 2, in the fuel injection device 1, a first injector unit 101, which is an upstream side structural body including the pilot injection block 31 of the pilot fuel injector 21 and the main injection block 93 of the main fuel injector 23, is supported by a combustor housing 3 by means of a stem portion 26 and a second injector unit 103, which is a downstream side structural body including the pilot nozzle 37 and the main nozzle referred to above is supported by the annular combustion liner 9 through a support flange 105 provided in an outer periphery of the downstream end portion of the outer main shroud 86. The first injector unit 101 and the second injector unit 103 are separately assembled and, after the assembly of each of those units 101 and 103, the first injector unit 101 is mounted on the second injector unit 103 to complete the fuel injection device 1. In this way, the first injector unit 101 is so formed as to be detachable relative to the second injector unit 103.

Next, an operation of the fuel injection device 1 configured as illustrated above will be described. As shown in FIG. 3, at low power settings, the fuel F injected from the pilot fuel injector 21 and air A1 injected from the inner diameter side air injection opening 75 which is the first opening cooperatively form a pilot combustion region S in a portion within the combustion chamber 15 at the downstream side of the pilot fuel injector 21. Meanwhile, the air injected from the main fuel injector 23 forms main air flow MA at the outside of the pilot combustion region S. Since the flame stabilization plate 73 includes the inclined portion 73b which is inclined radially outwardly and in a downstream direction relative to the axis, interference between the pilot combustion region S and the main air flow MA is effectively prevented, whereby flame is assuredly stabilized in the pilot combustion region S, and the combustion efficiency is improved. Therefore, it is possible to improve the combustion efficiency not only at intermediate power settings but also at low power settings. In addition, an air A2 supplied from the outer diameter side air injection opening 77 which is the second opening flows into the inflow space 79 defined between the flame stabilization plate 73 and the partition wall plate 71 to cool the flame stabilization plate 73. Thus, burnout of the flame stabilization plate 73 is prevented. In order to further assuredly prevent interference between the pilot combustion region S and the main air flow MA, the flame stabilization plate 73 may be spaced apart from the partition wall plate 71 specifically by 0.7 to 2.0 mm and more specifically by about 1.0 mm.

Furthermore, by supplying the air A1 from the inner diameter side air injection opening 75, it is possible to avoid a state where the fuel is excessive in the pilot combustion region S, and thus occurrence of smoke is suppressed.

In addition, since the peripheral wall 73a which is continued to the upstream side of the inclined portion 73b, and extends in the axial direction, so as to form the outer periphery of the inner diameter side air injection opening 75 is provided in the flame stabilization plate 73, the air supplied from the outer diameter side air injection opening 77 does not flow into the inner diameter side and is assuredly discharged in the radially outward and downstream direction. Therefore, it is possible to more assuredly improve the combustion efficiency and suppress smoke.

Moreover, in the present embodiment, the pilot fuel injector 21 and the main injector 23 are connected to each other via the partition wall 63 which forms the reservoir space 69 for the compressed air CA at the downstream side of the air injection unit 25, and the introduction port 65 through which the compressed air is introduced into the reservoir space 69 is formed in the partition wall 63. Since the air flows via the reservoir space 63, the distribution of the air injected from the first opening and the second opening can be made uniform.

Furthermore, the fuel injected from the pilot fuel injector 21 is assuredly diffused to the radially outer side by the pilot inner swirler SW1 and the pilot outer swirler SW2 provided in the pilot fuel injector 21. Thus, flame stability at the flame stabilization plate 73 is ensured, and the combustion efficiency is further assuredly improved.

Although the present invention has been described above in connection with the preferred embodiments thereof with reference to the accompanying drawings, numerous additions, changes, or deletions can be made without departing from the gist of the present invention. Accordingly, such additions, changes, or deletions are to be construed as included in the scope of the present invention.

REFERENCE NUMERALS

1 . . . Fuel injection device
15 . . . Combustion chamber
21 . . . Pilot fuel injector
23 . . . Main fuel injector
25 . . . Air injection unit
69 . . . Inflow space
71 . . . Partition wall plate
73 . . . Flame stabilization plate
73b . . . Inclined portion
75 . . . Inner air injection opening (first opening)
77 . . . Outer diameter side air injection opening (second opening)

What is claimed is:

1. A fuel injection device for supplying a fuel to a compressed air from a compressor for combustion, the fuel injection device comprising:
a pilot fuel injector located at a radially center portion of the fuel injection device and configured to inject the fuel into a combustion chamber;

a main fuel injector located at an outer periphery of the pilot fuel injector and configured to inject a premixed air-fuel mixture of the fuel and the compressed air into the combustion chamber; and an air injection unit located between an outlet end portion of the pilot fuel injector and the main fuel injector and configured to inject the compressed air into the combustion chamber, the air injection unit including:
- a partition wall plate provided at a downstream end portion of an inner main shroud that forms a part of the air injection unit;
- a flame stabilization plate secured to the partition wall plate and provided at a downstream side of the partition wall plate;
- a first opening provided between the flame stabilization plate and the outlet end portion of the pilot fuel injector and opened at a downstream side; and
- a second opening which is provided in the partition wall plate and through which the compressed air is supplied to an inflow space defined between the flame stabilization plate and the partition wall plate, and the flame stabilization plate includes an inclined portion inclined in a radially outwardly and in a downstream direction with respect to a fuel injection centerline axis, and a first portion substantially parallel to the fuel injection centerline axis and a second portion substantially parallel to the partition wall plate, wherein the partition wall plate is angled radially inward towards the upstream end of the fuel injection centerline axis.

2. The fuel injection device as claimed in claim 1, wherein the second opening is provided as a throughhole formed in a portion of the partition wall plate that is covered by the flame stabilization plate so as to extend axially.

3. The fuel injection device as claimed in claim 1, wherein the inclined portion extends substantially parallel to the partition wall plate.

4. The fuel injection device as claimed in claim 1, wherein the flame stabilization plate includes a peripheral wall portion which is continued to an upstream side of the inclined portion and extends in an axial direction, so as to form an outer periphery of the first opening.

5. The fuel injection device as claimed in claim 1, wherein the pilot fuel injector and the main fuel injector are connected to each other via a partition wall forming a reservoir space for the compressed air at a downstream side of the air injection unit, and the partition wall is formed with an introduction port for introducing the compressed air into the reservoir space.

6. The fuel injection device as claimed in claim 1, wherein the pilot fuel injector is provided with a swirler configured to swirl the compressed air about an axis of the swirler.

* * * * *